United States Patent

[11] 3,622,797

[72] Inventor Herbert E. Bragg
 Oxford, N.J.
[21] Appl. No. 51,965
[22] Filed July 2, 1970
[45] Patented Nov. 23, 1971
[73] Assignee Twentieth Century-Fox Film Corp.
 New York, N.Y.

[54] RADIATION SENSITIVE AUTOMATIC FOCUS SYSTEM
 5 Claims, 1 Drawing Fig.

[52] U.S. Cl. .................................................. 250/234,
 353/101, 178/7.2 E, 250/204, 352/140
[51] Int. Cl. ...................................................... H01j 7/24
[50] Field of Search .......................................... 250/234,
 229, 204; 178/7.2 E, 7.2 D, 7.92; 355/55; 352/140;
 353/76, 101; 356/123, 125; 95/44 B

[56] References Cited
 UNITED STATES PATENTS
 2,831,057 4/1958 Orthuber .................. 178/7.2 E
 2,838,600 6/1958 Salinger .................... 178/7.2 E
 2,838,601 6/1958 Cavanaugh et al. ...... 178/7.92
 3,111,666 11/1963 Wilmotte .................. 250/229 X
 3,450,833 6/1969 Hobrough ................. 178/7.2 E Primary Examiner—Walter Stolwein
Attorney—Albert M. Parker ABSTRACT: A system for automatically keeping a projected film image in sharp focus on a screen in any projection system by electronically comparing samples taken from the projected beam and moving the projection lens to its position for optimum focus. The selected sample is passed successively through optical systems of different focal lengths to form successive images on a television pickup tube, the outputs of the pickup tube for each successive image are integrated and the integrated outputs are sequentially compared in a differential relay circuit which controls a motor coupled to the projection lens for automatically moving the projection lens to its position for optimum focus.

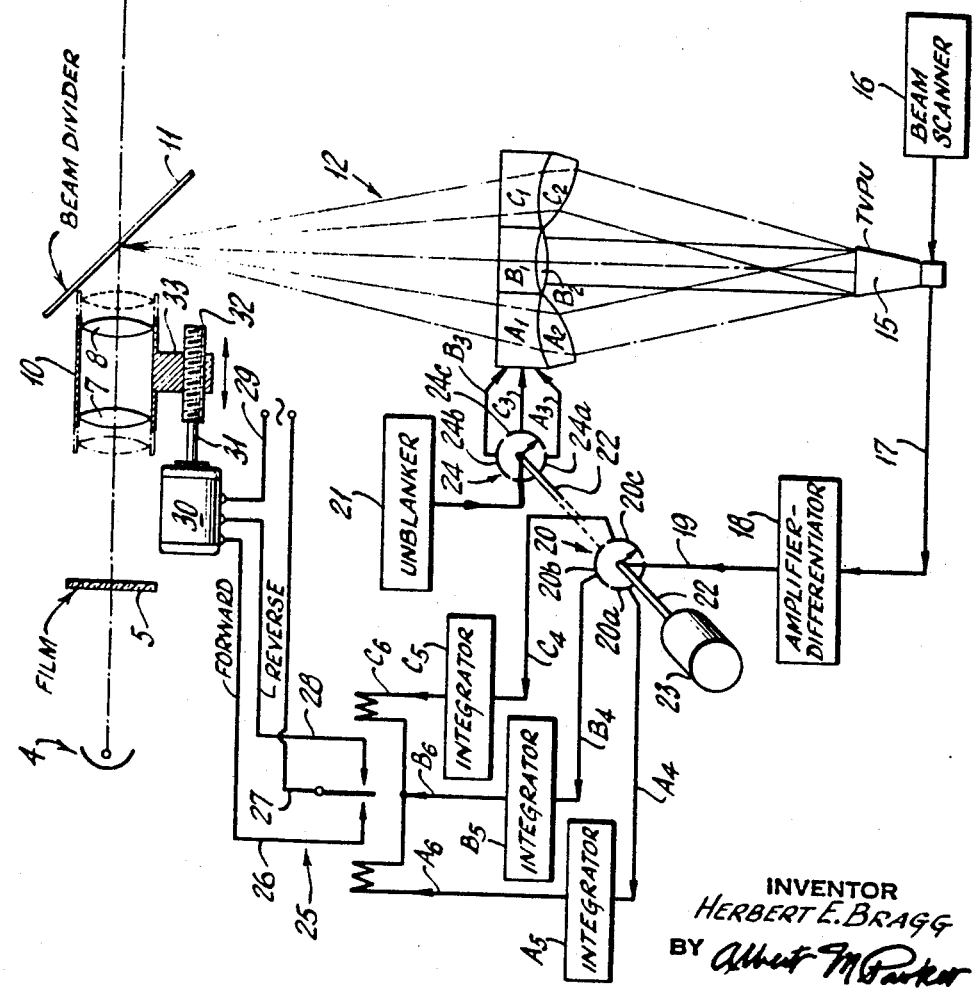

RADIATION SENSITIVE AUTOMATIC FOCUS SYSTEM

BACKGROUND OF THE INVENTION

1. Field of the Invention

This invention relates to a system for automatically keeping a projected film image sharply focused on a projection screen without correction by the operator. The system is suited to use with motion picture or still picture projection apparatus.

2. Description of the Prior Art

In the projection of film images on to projection screens the maintenance of the projected image in sharp focus is of primary importance. In the past, this has been done by means of visual observation by an operator of the projection apparatus who has manually adjusted the projection apparatus for sharp focus at the start of projection and has made repeated adjustments during the course of operation of the projection apparatus whenever he has noticed that the projected image is not in sharp focus. OPerator error is an obvious problem of this prior art projection technique.

Automatic focus devices are now available with some slide projectors. Generally, they respond to a supplementary light beam which is reflected from the surface being projected upon onto photosensors which then operate a simple servo to maintain the projection lens of the film mount in the optimum focus position. These are effective, if at all, only in a limited number of applications.

If an initial adjustment of the projection apparatus would suffice, the problem would not be so serious, but as is well-known, readjustment during projection is required to maintain sharp focus. Various factors contribute to deviation from optimum focus. Motion picture films, especially older films, tend to curl out of the desirable flat state in use through uneven expansion, and the resulting curved surface of the film causes the image to go out of focus. Heating of the projection lens itself during the course of operation and the consequent thermal expansion of the lens gradually changes the focal length of the system. The mechanical parts which hold and house the optical elements of the projection apparatus also heat up and expand unevenly, resulting in movement of the optical system components during operation. In the past repeated manual adjustment to correct for these deviations has been required.

Because of these problems, it has long been desired to provide a system which would automatically keep the film image on a projection screen in sharp focus without correction by an operator.

SUMMARY OF THE INVENTION

In the automatic focus system of the invention, a small percentage of the light projected toward the projection screen from a projection apparatus is separated and deflected away from the main optical axis by means of a prism or beam divider to form a sample or supplementary beam. This sample beam is directed to a cooperating array of special optical elements, preferably an odd number of lenses, one of which will produce a focused partial image at the face of a television pickup tube whenever the projection lends is in proper position for optimum focus of the projected projected film image on the projection screen. The other lenses are adapted to produce a sharply focused image at the television pickup tube for other positions of the projection lens at which the image on the projection screen is not sharply focused. Preferably an array of five lenses is employed, so that a sharp image is formed at the pickup tube when the projection lends is in any of four out-of-focus positions two of which would produce sharp images ahead of the projection screen and two of which would produce a sharp image behind the projection screen.

At any given time, only one of the lenses of the array passes its transmitted beam of light to the face of television pickup tube, the other lenses being covered or "blanked." Each of the lenses is opened or "unblanked" in rapid sequence so the images produced by the several lenses succeed each other at the face of the pickup tube. Preferably the lenses are blanked by suitably positioned electro-optical modulators of the type which control the intensity of the beam of light passing therethrough, one modulator being associated with each lens. The electro-optical modulators are of the type which are either transparent or substantially opaque to visible light depending upon whether or not they are receiving an electrical signal.

The television pickup tube is of appropriate design to scan each successive partial image projected upon its face during the brief time that the corresponding lens is unblanked. The electrical output signals of the television pickup tube are amplified and differentiated and then integrated by a plurality of separate integrator circuits corresponding to the lenses of the array, the lenses being unblanked in synchronism with the switching of the pickup tube output to the integrator circuits corresponding to each lens in succession The integrated output voltages are directly proportional to the rate of change of the brightness and therefore to the sharpness of the images projected on to the television pickup tube through the corresponding lenses.

The integrated output signals are fed to a differential relay circuit which controls a reversible motor for mechanically driving the projection lens forward or back. When the signals to the differential relay from the lenses associated with out-of-focus positions of the projection lens are either very small or when these signals are equally balanced, the motor is switched off. Should the signal associated with one of the out-of-focus positions of the lens exceed that of the output signal representing sharp focus on the screen by a predetermined amount, the differential relay will automatically switch on the motor to drive the projection lens either forward or back to compensate for the displacement determined.

Color filters may be included in the system to insure sharp focus at a particular color distribution desired. Also, a storage system may be provided to damp the system so that it will not respond to focus shifts as successive individual frames of film and the system will not respond to frequent changes by hunting but will correct the lens position only when the image has been out of focus over a predetermined time interval.

BRIEF DESCRIPTION OF THE DRAWING

The drawing is a functional diagram in simplified form of an illustrative embodiment of the automatic focus system of the invention.

DESCRIPTION OF A PREFERRED EMBODIMENT

The functional diagram of the FIGURE illustrations an embodiment of the system according to the invention in which an array of three blanking devices $A_1$, $B_1$, $C_1$ control the passage of a sample beam to lenses $A_2$, $B_2$ and $C_2$ respectively, each in sequence. In a preferred form of the invention five cooperating lenses are used, since the greater the number of lenses, the smaller the increments, with elimination of the uncertainty of being halfway between two positions, and with a much more reliable control. For simplicity of illustration, however, the operation of the system with three lenses is depicted in as much as the construction and operation of a three-lens system is sufficiently the same except for the number of lenses used.

A strip of film or other transparency 5 through which light from a suitable source 4 is transmitted is shown at a position in which the film 5 is so positioned with respect to the projection lens assembly 10 as to provide the capability of projecting the image carried by the film 5 in sharp focus on a screen surface 6. The projection lens assembly 10 is illustrated schematically as including a pair of lens elements 7 and 8 mounted at spaced locations in a lens tube, though it is to be understood that this showing is purely for illustrative purposes since in practice the lens arrangement could differ widely from what is shown here.

At a point near the lens assembly 10, a beam divider 11, which may be a mirror, a prism or other suitable device, intercepts a small sample portion 12 of beam 14 passing from the projection lens assembly 10 to the screen 6. Preferably the sample beam 12 is directed at an angle of about 90° away from the principal optical axis. The sample beam diverts a portion of the light which would otherwise be focused at the screen surface 6 and is therefore representative of the light which forms the projected image.

Subject to the sequential unblanking of the blanking elements $A_1$, $B_1$, and $C_1$ the sample beam 12 is directed by their respective lenses $A_2$, $B_2$, $C_2$ onto the face of a television pickup tube 15. If the sample beam 12 were not intercepted by the lenses $A_2$, $B_2$ and $C_2$ it would, of course, form an image with focus of the same sharpness at the same distance from the film 5 as does the principal beam 14.

Before proceeding further it should be noted that the reference characters A B and C with various numerical suffixes are used to indicate related elements throughout the system, to simplify the understanding of the disclosure.

The center lens $B_2$ is selected and positioned at such a point in the sample beam as to form an image in sharp focus on the face of the television pickup tube 15 whenever the principal beam forms an image in sharp focus at the screen surface 6.

The lenses $A_2$ and $C_2$ represent sharp focus of the projected image respectively at planes in front of and behind the screen 6 in that the optical distances from the film 5 to the television pickup tube 15 through the lenses $A_2$ and $C_2$ are respectively less and greater than the optical distance to the tube 15 through the central lens $B_2$ which represents optimum focus. Thus, for example, the image produced at the face of the pickup tube 15 through the lens $A_2$ will be sharpest when the projection lens system 10 is too close to the film 5 and the image produced by the lens $C_2$ will be sharpest when he projection lens system 10 is too far from the film 5.

The lenses $A_2$, $B_2$ and $C_2$ are successively unblanked and direct light to the pickup tube by means which will be further described in detail hereafter. As the successive images from each of these lenses are projected onto the face of the television pickup tube 15, the images are scanned through the operation of a beam scanning device 16 connected to the pickup tube 15. The tube 15, in connection with the beam scanner 16, is adapted to convert the information received in the form of light into an electrical signal which is fed through a lead 17 to an amplifier-differentiator device 18. The amplifier-differentiator device 18 is preferably a high contrast differentiating circuit which generates maximum pulses when the rate of change, that is, the derivative function of the output voltage to the differentiator 18, is at its maximum. This condition of maximum rate of output voltage change occurs when the image is in focus on the tube 15. The system may be so adjusted that the images of the grain structure of the film 5 are used for this determination of sharpness of focus, thus assuring that the image projected on the screen 6 will have maximum apparent definition.

The output from the amplifier-differentiator 18 flows through a lead 19 to a segmented scanner switch element 20, shown schematically in the drawing as a mechanical scanner switch for purposes of simplicity, although obviously an electronic switching element could be used. The switch 20, as shown, is in the form of a disc having contact segments 20a, 20b, and 20c insulated from each other and extending equal distances about the disc. These segments serve to connect the leads $A_4$, $B_4$, $C_4$ with the lead 19 from the amplifier-differentiator 18 at the proper times to transmit the respective output signals therefrom. Accordingly, the output signals flow successively through the leads $A_4$, $B_4$ and $C_4$ are consecutively to each of three integrators $A_5$, $B_5$ and $C_5$ arranged to perform similar functions.

The scanner switch 20, as here illustrated, it mounted on a shaft 22 driven at the proper speed by a synchronous motor or other suitable drive means 23. The shaft 22 also carries a switch element 24 similar to the switch 20 and which is rotated in synchronism with the switch 20. The element 24 is also segmented at 24a, 24b, and 24c in phase relationship with the segments 20a, 20b, and 20c.

The switch element 24 serves to connect the unblanker 21 with the blanking elements $A_1$, $B_1$ and $C_1$ through the segments 24a, 24b and 24c and the leads $A_3$, $B_3$ and $C_3$. Thus unblanking of the lenses $A_2$, $B_2$ and $C_2$ takes place in synchronism with the action of the other elements of the system.

The combined lettering and numbering system of reference characters used on the accompanying drawing is intended to facilitate the following of like signals through the system.

It is, of course, to be understood that other mechanical or electrical devices or combinations of the same can be employed to achieve the synchronous relationship here, the present showing being a simplified illustrative one.

The blanking components $A_1$, $B_1$ and $C_1$ could be mechanical shutters actuated by the unblanker device 21, but in the preferred form of the system shown in the drawing, the unblanker 21 is an electrical device for sequentially supplying voltage signals to the three electro-optical modulators $A_1$, $B_1$ and $C_1$ of the spatial type. Electro-optical modulator of the spatial type are optical elements which vary the physical qualities of a light beam such as direction, intensity, beam width, etc. in response to an electrical input signal. A type of commercially available electro-optical modulator in the form of a crystal which becomes substantially opaque to the passage of light when a voltage differential is applied across the crystal is well known. Such electro-optical modulators can currently be utilized to achieve almost complete extinction of a light beam when they are opaqued or blanked, yet are normally optically transparent when not blanked. Suitable electro-optical modulators are discussed in an article by Robert D. Compton entitled "The promising World of Electro-Optical Modulators" appearing in Electro Optical Systems Design, Vol. 1, No. 2, Sept. 1969.

The outputs of the three integrators $A_5$, $B_5$ and $C_5$ are sequentially compared through leads $A_6$, $B_6$ and $C_6$ by means of a differential relay, shown schematically at 25, which controls a reversible motor 30 coupled to the projection lens assembly 10 for driving the lens assembly forward or back. The integrators $A_5$, $B_5$ and $C_5$ convert the discontinuous signals received through their inputs $A_4$, $B_4$ and $C_4$ into continuous electrical signals at their respective output leads. The integrator outputs are directly proportional to the sharpness of the images produced on the television pickup tube 15 through the lenses $A_2$, $B_2$ and $C_2$.

The differential relay 25 is operatively connected by a powerline 27 to a power source, indicated conventionally in the drawing, and to the forward and reverse poles of the reversible motor 30. The connecting lines 26 and 28 from the relay 25 to the motor 30 are respectively labeled "FORWARD" and "REVERSE" in the drawing to indicate clearly the operation of the relay 25 as a control for the motor 30. The motor is also connected to the power source by a line 29.

The motor 30 is switched OFF by the relay 25 when the signals through the leads $A_6$ and $C_6$ are very small, or when they are equal. This situation exists when the image on the projection screen 6 is in sharp focus as well as in the trivial case when no light reaches the television pickup tube. But when either of the signals at $A_6$ or $C_6$ exceeds the signal at $B_6$ the differential relay causes power to flow to the motor 30. Since the signals at $A_6$, $B_6$ and $C_6$ are directly proportional to the sharpness of focus on the television pickup tube 15 of images produced through the lenses $A_2$, $B_2$ and $C_2$, the motor 30 is thus switched OFF when the sharpest focus is obtained through the lens $B_2$, and the motor 30 is switched ON when the image produced through either lens $A_2$ or lens $C_2$ is sharper than that produced through lens $B_2$. It is preferable that the difference between the signals at $A_6$ or $C_6$ and the control signal $B_6$ be required to exceed a predetermined amount before the relay 25 is tripped to switch on the motor 30.

When the signal at $A_6$ is the largest of the three signals fed to the relay 25, power flowing through the line 27 is fed to the line 26, completing a circuit to the motor which causes the motor to run forward. Similarly when the signal at $C_6$ is greatest, power is fed to the motor through REVERSE power line 28, causing the motor 30 to operate in reverse.

The drive shaft 31 of the motor 30 is shown to be mechanically coupled to the projection lens assembly 10 by a screw 32 firmly mounted on the shaft 31 which is rotatably fitted within a threaded member 33 affixed to the assembly 10. Forward or reverse rotation of the drive shaft 31 is thus converted into linear motion of the assembly 10, moving the same either forward back. Obviously any other mechanical movement for converting rotational motion into linear motion could be used in place of the screw movement illustrated, if desired, or an electrical system might be used. The particular mechanical movement illustrated is provided for the sake of simplicity.

The mode of operation of the automatic focusing system will now be exemplified with reference to the simplified by operable system shown schematically in the drawing.

Assuming that a projector is in operation, projecting a film image in sharp focus onto the screen 6 through the projection lens assembly 10, the image produced on the television pickup tube 15 through the lens $B_2$ will be sharper than that produced by either the lens $A_2$ or the lens $C_2$. Therefore the amplified and differentiated signal $B_4$ will be larger than either $A_4$ or $C_4$, the output at $B_6$ of the integrator $B_5$ will exceed both of the integrated outputs at $A_6$ and $C_6$ and the differential relay 25 upon comparing the integrated output signals will supply no power to the motor 30.

During continuous projection the mechanical elements of the projection apparatus may heat up and their consequent thermal expansion might move the film 5 closer to the projection lens assembly 10. It can be readily seen that decreasing the distance between the film 5 and the lens 7 will produce a projected image which is out of focus on the projection screen 6, the optimum focus being produced in a plane in front of the screen 6, closer to the projector This condition is sensed and corrected very rapidly by the system of the invention.

The sample beam 3 passing through the array of lenses $A_2$, $B_2$ and $C_2$ to the pickup tube 15 is representative of the main beam to the screen 6. Since the focal length of the system has now become too short, the lens $A_2$ produces a sharper image on the pickup tube 15 than do either of the lenses $B_2$ and $C_2$. The integrator output at $A_6$ corresponding to lens $A_2$ is thus larger than that at either $B_6$ or $C_6$, so the differential relay 25, responsive to the largest signal $A_6$ will energize the motor 30 to move the lens assembly 10 in the forward direction. The forward movement of the lens assembly 10 will continue until the differential relay switches off the motor, which will take place as soon as the signal $B_6$, representing optimum focus on the screen, exceeds the signals $A_6$ and $C_6$ by a predetermined amount. The projection system is again in its condition of sharpest focus.

The response of the system to focus error in the opposite direction will be an automatic correction by moving the lens assembly 10 back toward the film 5. The unblanking of the special optics elements is preferably done with great rapidity, so that the system responds very quickly to an unfocused condition by correcting the position of the projection lens assembly 10. The frequency of unblanking is limited, of course, by the speed at which the television pickup tube is scanned, but it will be appreciated that this speed is very fast. Thus the motor will be turned on, to move the assembly 10 forward or back whenever the picture on the screen 6 goes out of focus.

If the system is being used with motion pictures, however, it is not desirable that the system respond every time a single frame of film is not sharply focused on the screen. If the unblanking of the lenses and the scanning of the television pickup tube were to occur at too rapid a rate, the system might well attempt to correct for each frame of film. To avoid this, a delay or storage circuit may advantageously be provided in the system to damp the system so that it will not attempt to adjust the focus until an out-of-focus condition has prevailed for a predetermined short time interval.

It will be seen from the foregoing description that a system with three control optics, $A_2$, $B_2$ and $C_2$, is operable, but a system with five control optics is preferable. The addition of two more lenses to the system just described ones lens representing sharp focus at a plane still further away than that represented by lens $C_2$, and one representing sharp focus at a plane closer than that of the lens $A_2$, has the advantage that greater focus excursion or more precise control, or both, of the lens assembly 10 will be achieved. Should focus control be required over even greater excursion of the lens assembly 10, or should even finer focus control be required, additional control optics may be added. There will thus always be an integrator output signal to the differential relay which is recognizably larger than the other signals when additional control optics are used. The preferred system with five special optics is similar to the three lens arrangement shown in the drawing, utilizing five electro-optical modulators and a five-position scanner switch element in the same fashion as the three sets of elements are used in the illustration.

It will be apparent to those skilled in the art that by using commercially available components the described system can be provided in a compact size and at an economical cost. The system is preferably assembled as a small unit, which can, for example, be accommodated within the average projection room of a motion picture theater. The only modifications of any conventional slide or motion picture projection apparatus which is necessary are the attachment of motor driven projection lens adjusting elements such as elements 32 and 33 to supplement the ordinary hand-focusing knob of the projector, and the positioning of the beam divider 11 in front of the projection lens to provide the supplementary beam.

Numerous modifications and substitutions in the system, falling within the spirit and scope of the invention, will suggest themselves to those skilled in the art. For example, although three special optics elements are shown in the drawing, in the preferred form, five lenses are used, as described above. It will be obvious that two special optics, or any greater number could be employed. Also, the illustrated embodiment of the system utilizes one television pickup tube, but it is obvious that one pickup tube could be provided for each of the special optics so that the beam samples could be constantly compared and sequential sampling would be unnecessary. Another modification might be the use of mechanically operated shutter arrangements instead of the electro-optical modulators utilized in he preferred embodiment of the invention.

NOr is the system limited to use in the focusing of projected film images on a projection screen. It is contemplated that there may be other uses of the system in connection with other systems in which control of a beam of light is desirable. It could be used for maintaining the proper focus of an image in space on a photographic plate or human eye. It could be used for focusing a camera, particularly when taking the picture of a well-defined object. It could also be used for the proper focusing of an image onto a television pickup tube, into the human eye, or image produced by a microscope.

Such modifications of the system and/or elements of the invention, as disclosed in this specification and shown in the accompanying drawings, that might be needed to adapt the system of the invention to any of the possible alternative uses just set forth, and any other use to which the system would be adaptable, would suggest themselves to those skilled in the art without departing from the spirit and scope of the invention. It is accordingly to be understood that the disclosure of the invention made in the foregoing and shown in the accompanying drawing is for illustrative and not limiting purposes.

What is claimed is:

1. A system for automatically keeping a light image in sharp focus, comprising: means for deflecting a representative portion of an image forming main beam of light to form a sample beam producing a sample image; means for altering the focus of the sample image to simulate adjustment of the focus of the light image formed by said main beam; means for sensing the sharpness of focus of said sample image; comparing means for determining whether said sample image is in sharper focus when the focus of said sample image is altered to simulate adjustment or when it is not so altered; and actuating means for automatically adjusting the focus of said light image formed by said main beam when said sample image is in sharper focus in its altered form; the altering means including a plurality of optical elements having mutually different focal lengths, means for blanking off said optical elements from light from said sample beam and unblanking means for allowing light from said sample beam to pass through each of said optical elements in sequence to form successive images simulating different conditions of focus of the light image formed by the main light beam; the sensing means including means for producing electrical signals indicative of the sharpness of focus of each of said successive images; and the comparing means including a differentiating circuit for selecting the maximum signal from among the signals produced by the sensing means.

2. A system for automatically keeping a projected film image in sharp focus on a screen by adjustment of the projection apparatus comprising: beam divider means for deflecting a representative portion of a projected main light beam to form a sample beam; a plurality of lenses positioned for intercepting and transmitting light from said sample beam, said lenses having different focal lengths to form a sample image in sharp focus for different conditions of focus of the film image formed by said projected main light mean; means for blanking off said lenses from light from said sample beam and unblanking means cooperating with said lenses to unblank each lens in sequence while keeping the other lenses blanked off; a television pickup tube so positioned that successive sample images will be formed at the pickup tube by light transmitted through each of the lenses as the lenses are sequentially unblanked; means for scanning the television pickup tube whereby corresponding electrical signals proportional to the sharpness of focus of the sample images on the tube are produced; means for amplifying and differentiating said electrical signals; means for integrating the amplified and differentiated electrical signals corresponding to each of the successive sample images; a scanner switch device cooperating with said unblanking means for sequentially passing the electrical signal corresponding to the sample image produced by each lens to the integrating means while said lens is unblanked; differential relay means for comparing the integrated signals and selecting the strongest of said integrated signals; and a reversible motor actuated by said differential relay means to cause a focus adjusting means to adjust the focus of the projecting apparatus in the direction indicated by said strongest signal.

3. The system of claim 2 wherein the unblanking means includes a plurality of electro-optical modulators, one of aid electro-optical modulators corresponding to each of said lenses, said modulators being adapted to allow light to pass through their respective lenses in sequence depending upon whether or not an electrical signal controlled by said scanner switch device is being received by the modulator.

4. A method for automatically keeping a projected light image in sharp focus comprising: projecting an image forming light beam, separating a representative sample portion of light from said image forming light beam; optically, sequentially altering said sample portion of light to simulate different conditions of focus of the light image formed by said beam; imaging the optically altered sample portion of light to produce sequential sample images and electronically producing an electrical signal which is proportional to the degree of contrast in each of the sample images; comparing said electrical signals and causing the focus of the light image formed by said light beam to be corrected whenever the strongest of the electrical signals compared corresponds to simulation of a condition of focus which differs from the actual condition of focus of the image formed by the light beam.

5. The method of claim 10 wherein said optical alternation of said sample portion of light is accomplished by allowing said sample portion of light to pass successively through each of a plurality of lenses to form a sequence of images with mutually different degrees of sharpness of focus.

* * * * *

UNITED STATES PATENT OFFICE
CERTIFICATE OF CORRECTION

Patent No. 3,622,797            Dated November 23, 1971

Inventor(s) Herbert E. Bragg

It is certified that error appears in the above-identified patent and that said Letters Patent are hereby corrected as shown below:

Column 1, line 19, "OPerator" should read --Operator--;

line 58, "lends" should read --lens--;

line 65, "lends" should read --lens--;

Column 2, line 36, "as" should read --at--;

line 48, "FIGURE illustrations" should read

--Figure illustrates--;

Column 4, line 29, "promising" should read --Promising--;

Column 5, line 74, "described ones" should read --described, one--;

Column 6, line 41, "he" should read --the--;

line 42, "NOr" should read --nor--;

Column 8, line 31, should read --5. The method of claim 4 wherein said optical alternation--.

Signed and sealed this 28th day of November 1972.

(SEAL)
Attest:

EDWARD M. FLETCHER, JR.            ROBERT GOTTSCHALK
Attesting Officer                    Commissioner of Patents